United States Patent
Sama

(10) Patent No.: US 8,862,587 B1
(45) Date of Patent: Oct. 14, 2014

(54) SERVER AND SYSTEM FOR AUTOMATIC PROFILING BASED IN PART ON USER NAMES

(75) Inventor: Venkata Babji Sama, Islandia (IN)

(73) Assignee: CA, Inc., Islandia, NY (US)

(*) Notice: Subject to any disclaimer, the term of this patent is extended or adjusted under 35 U.S.C. 154(b) by 0 days.

(21) Appl. No.: 13/204,308

(22) Filed: Aug. 5, 2011

Related U.S. Application Data

(60) Provisional application No. 61/371,140, filed on Aug. 5, 2010.

(51) Int. Cl.
*G06F 17/30* (2006.01)

(52) U.S. Cl.
USPC .......................................... 707/740

(58) Field of Classification Search
CPC ................................. G06F 17/30132
USPC ........... 707/2, 3, 706, 740; 709/224; 235/381; 379/88.13
See application file for complete search history.

(56) References Cited

U.S. PATENT DOCUMENTS

| | | | |
|---|---|---|---|
| 6,129,274 A * | 10/2000 | Suzuki | 235/381 |
| 7,603,331 B2 | 10/2009 | Tuzhilin et al. | |
| 7,657,907 B2 | 2/2010 | Fennan et al. | |
| 7,693,836 B2 | 4/2010 | Brave et al. | |
| 7,873,621 B1 * | 1/2011 | Datar et al. | 707/706 |
| 2007/0230787 A1 * | 10/2007 | Belitskaya et al. | 382/182 |
| 2008/0240379 A1 * | 10/2008 | Maislos et al. | 379/88.13 |
| 2010/0030894 A1 * | 2/2010 | Cancel et al. | 709/224 |

* cited by examiner

*Primary Examiner* — Etienne Leroux
(74) *Attorney, Agent, or Firm* — Vierra Magen Marcus LLP

(57) ABSTRACT

A method, apparatus, and system for generating a profile of a person. The method may include storing a plurality of names, each name being associated with a plurality of name characteristics unique to the name, such as nativity, religion, gender, family social status, and time period. In response to receiving a name to be profiled, one or more associated name characteristics may be used to infer one or more user characteristics such as age, interests, habits, economic potential, and likelihood of buying something at a given point of time. The user characteristics may be provided as a profile of the person.

18 Claims, 5 Drawing Sheets

SERVER AND SYSTEM FOR AUTOMATIC PROFILING BASED IN PART ON USER NAMES

CROSS-REFERENCES TO RELATED APPLICATIONS

This application claims benefit under 35 U.S.C. 119(e) of U.S. Provisional Patent Application No. 61/371,140, filed on Aug. 5, 2010, which is herein incorporated by reference in its entirety for all purpose.

BACKGROUND

Embodiments of the present invention relate to profiling individuals, and in particular to profiling individuals based on their name.

User profiling is a well-studied problem owing to its varied applications, such as promoting goods, efficient information search, fraud detection, etc. Accordingly, various techniques for profiling users are known in the art. One profiling technique tracks the behaviors of website visitors so as to improve enterprise search and navigation results. The technique employs a knowledge index that is based on various attributes such as subject authority, work patterns, content freshness, and group know-how.

Another profiling technique enables a user to narrow their search for interesting TV programs and/or videos to watch. Given that there are a large number of TV channels, movies, etc. available for a user to watch, it is very time consuming for a user to scan through all the available channels to choose interesting ones. The technique develops a user profile either using some user specified keywords (such as action, comedy, etc.) or automatically using a history of channels watched by the user.

In another profiling technique, both static and dynamic profiles of users are used to make shopping recommendations to the users. Static profiles include such information as demographic data, purchasing preferences, etc. Dynamic profiles are captured as rules. An example rule is: "If user X travels for more than a week, then when (s)he returns, (s)he will buy a lot of groceries."

In summary, all of the existing user profiling techniques make use of static and dynamic data of users to develop a pattern for each specific user. In other words, the information used to develop profiles is different attributes pertinent to the users. However, significant effort and resources must be used to acquire these different attributes. For example, with respect to static data such as user demographics, numerous demographics such as age, gender, income level, etc. must first be acquired from the user. With respect to dynamic data, behaviors of the user must be monitored and recorded. Accordingly, in such known systems an undesirable amount of time must be invested prior to generating a user profile in order to acquire static and/or dynamic data from the user.

BRIEF SUMMARY

Embodiments of the present invention overcome some or all of the aforementioned deficiencies in the related art. According to some embodiments, methods, apparatuses, and systems for generating a profile of a person are disclosed. In one method, names of people and characteristics typically associated with those names are pre-stored. For example, a name may be associated with name characteristics such as a person's nativity, religion, gender, family social status, time period, etc. In some embodiments, such characteristics may be provided by naming experts. Once such information has been pre-stored, a name to be profiled may then be received. The received name may be compared to the stored names, and if a match is found, the associated name characteristics are identified. One or more associated name characteristics, for example, religion, may then be used to infer characteristics of the person having that name. For example, user characteristics such as interests, economic potential, likelihood to buy something, etc., can be inferred from the name characteristics. Such user characteristics may then be used as a profile of the user to, for example, generate customized offers for products or services.

In some embodiments, confidence values may be associated with the name characteristics. For example, a naming expert may associate a confidence value with a name characteristic indicating how confident they are that the name characteristic is a true characteristic of the name. In inferring user characteristics, the confidence values associated with the name characteristics may be used to determine a confidence value for the user characteristics. For example, a high confidence value of name characteristics such as economic potential and religious belief may result in an inference of a likelihood to purchase religious paraphernalia at a high level of confidence.

For a more complete understanding of the nature and advantages of embodiments of the present invention, reference should be made to the ensuing detailed description and accompanying drawings. Other aspects, objects and advantages of the invention will be apparent from the drawings and detailed description that follows. However, the scope of the invention will be fully apparent from the recitations of the claims.

DETAILED DESCRIPTION

Embodiments of the present invention relate to profiling individuals, and in particular to profiling individuals based on their name.

Traditionally, the naming of people may have been influenced by multiple factors, such as the nativity, religion, gender, social status of the family, time period, etc. Also, there is a tradition of changing the names of women after marriage. These facts may be exploited to trace back those details uniquely associated with the name of a person. Subsequently, the derived details may be useful in inferring useful information about the person having the name, such as the person's likely age, interests, habits, economic potential, likelihood of buying something at a given point of time, etc., eventually leading to a significant amount of profiling of the person using just the name. The technique may be effective and accurate, especially when used in conjunction with some other known details. The concept may be automated and offered as a service.

Name profiling in accordance with various embodiments of the present invention may be used in a variety of applications. For example, a retail seller may try to sell certain things based on native festival, native language, etc.; a travel agent might offer a tour because the person is likely to visit his or her native country or area during a festival in that region/religion; and an airport authority can choose appropriate accent for pronouncing the name based on the nativity during an announcement for that person. Although some of the embodiments discussed herein are directed to the offering of customized goods and/or services, the scope of applications is clearly not so limited.

Figure 1:
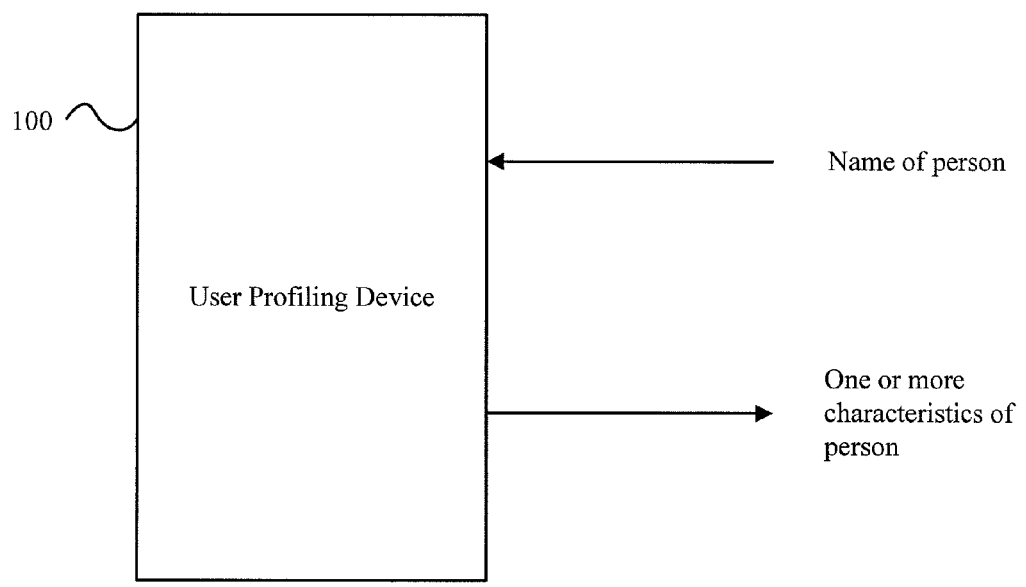
FIG. 1 is a user profiling device according to an embodiment.

FIG. 1 is a user profiling device 100 according to an embodiment. User profiling device 100 may be any suitable electronic computing device for performing user profiling in accordance with the embodiments described herein. Accordingly, user profiling device 100 may include any suitable components for performing such functions. For example, user profiling device 100 may include one or more processors, storage devices, input/output devices, and the like. Various elements that user profiling device 100 may include are further discussed with reference to FIG. 5.

User profiling device 100 is operable to receive a name of a person. The name may be received as a text string or other data element from any suitable source. For example, the name may be received from an electronic computing device associated with the person. For another example, the name may be received from a retail system for the purposes of enabling the retail system to provide customized offers for goods or services to a person having the name and interacting with the retail system in some fashion.

In response to receiving the name of the person, user profiling device 100 is operable to determine one or more characteristics of the person based on the received name. The characteristics of the person may include, for example, one or more of the person's age, interests, habits, economic potential, and likelihood of buying something at a given point of time. User profiling device 100 may determine such user characteristics using one or more of the techniques discussed herein. For example, user profiling device 100 may first identify one or more name characteristics. That is, characteristics uniquely associated with the received name, such as the person's nativity, religion, gender, family, social status, time period, etc. The user characteristics may then be determined using one or more of the name characteristics.

Once one or more characteristics of the person are determined, user profiling device 100 is operable to communicate at least one of the one or more characteristics. For example, user profiling device 100 may communicate all of the determined characteristics or only some of the determined characteristics. User profiling device 100 may communicate the determined user characteristics to any suitable entity. For example, user profiling device 100 may communicate the determined user characteristics to a device or system from which user profiling device 100 received the name of the person. For another example, user profiling device 100 may communicate the determined user characteristics to a device or system different than that which user profiling device 100 received the name of the person.

User profiling device 100 in certain embodiments is an electronic computing device utilizing one or more computer systems and components that are interconnected via communication links. However, it will be appreciated by those of ordinary skill in the art that user profiling device 100 may not be an electronic computing device, but rather software code operable to be executed by an electronic computing device and perform the functions discussed above with respect to user profiling device 100. Thus, the depiction of user profiling device 100 in FIG. 1 should be taken as being illustrative in nature, and not limiting to the scope of the disclosure.

Figure 2:
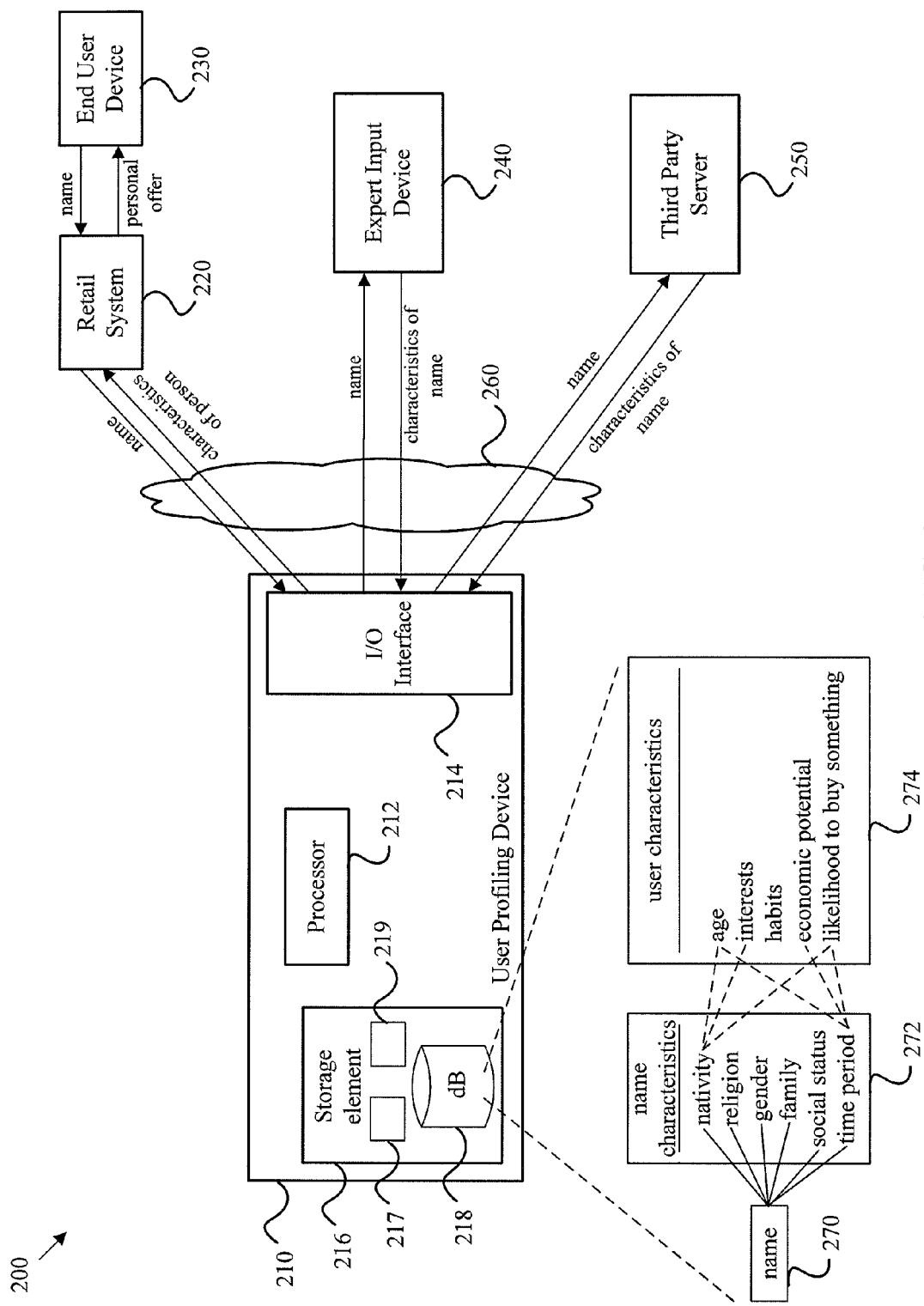
FIG. 2 is a simplified system illustrating an example environment for implementing aspects of one or more of the various embodiments disclosed herein.

FIG. 2 is a simplified system 200 illustrating an example environment for implementing aspects of one or more of the various embodiments disclosed herein. System 100 includes a user profiling device 210, a retail system 220, an end user device 230, an expert input device 240, a third party server 250, and a network 260.

User profiling device 210 is any suitable electronic computing device for performing user profiling in accordance with the embodiments described herein. User profiling device 210 according to one embodiment includes a processor 212, an input/output interface 214, and a storage element 216.

Processor 212 may include without limitation one or more general-purpose processors and/or one or more special-purpose processors (such as digital signal processing chips, graphics acceleration processors, and/or the like). Processor 212 may be operable to perform one or more of the functions discussed herein associated with user profiling device 210, and may be in communication with other elements of user profiling device 210, such as the input/output interface 214 and/or storage element 216.

Input/output interface 214 may include any suitable hardware and/or software components for enabling user profiling device 210 to communicate with other elements of system 100. For example, input/output interface 214 may include a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. Input/output interface 214 may permit data to be exchanged with a network (such as network 260, to name one example), other computer systems, and/or any other devices described herein.

Storage element 216 may include any tangible non-transient storage medium including, without limitation, a disk drive, a drive array, an optical storage device, solid-state storage device such as a random access memory ("RAM") and/or a read-only memory ("ROM"), which can be programmable, flash-updateable and/or the like. Storage element 216 may be configured to implement any appropriate data stores, including without limitation, various file systems, database structures, and/or the like. In one embodiment, storage element 216 may store software code executable by processor 212 so as to cause user profiling device 210 to perform one or more the functions discussed herein associated with user profiling device 210.

In one embodiment, storage element 216 includes database 218. Database 218 may store various information associated with determining characteristics of a person in one or more suitable database records. In an embodiment, database 218 is operable to store one or more names of users 270, one or more name characteristics 272 associated with each name, and one or more user characteristics 274 associated with the name characteristics 272. In some embodiments, database pointers may be used to associate various elements within database 218, such as associating the name characteristics 272 to name 270.

Name characteristics 272 may include one or more unique attributes that are associated with a name. For example, name characteristics 272 may include a person's nativity, religion, gender, family social status, time period, etc. A person's nativity is an indication as to that person's geographical origin. For example, a name may indicate the nativity of a person such as Indian, Chinese, American, European, etc. In some embodiments, the name may even indicate sub-regions. For example, in Indian names, the names of Tamilians, Bengalis, Assamese, etc., may be distinguishable from each other. A person's religion is an indication as to that person's religious beliefs. For example, a name may indicate the religion of a person such as Hindu, Christian, Muslim, etc. Other name characteristics are self-explanatory.

In one embodiment, database 218 may further store a confidence value for each of the name characteristics 272. The confidence value may indicate a level of confidence that the name characteristic is a true characteristic for the name. For example, the name Jeremiah may be associated with the Christian religion at an 80% level of confidence. The level of confidence may be expressed using any suitable measurement showing a range of values. For example, the level of confidence may be expressed as a percentage, a fraction, and/or as textual indicators ranging from, for example, extremely low to extremely high. In some embodiments the confidence value for each name characteristic may be returned from user profiling device 210 to the device, system, or entity from which user profiling device 210 received the name.

User characteristics 274 may include one or more characteristics that may be associated with a person. For example, user characteristics 274 may include a person's age, interests, habits, economic potential, likelihood to buy something, etc., each of which are self-explanatory.

In one embodiment, database 218 may further store a confidence value for each of the user characteristics 274. The confidence value may indicate a level of confidence that the user characteristic is a true characteristic for the person. For example, a Christian religion may indicate that the person has interest in visiting Christian churches at a 60% level of confidence. The level of confidence may be expressed using any suitable measurement showing a range of values. For example, the level of confidence may be expressed as a percentage, a fraction, and/or as textual indicators ranging from, for example, extremely low to extremely high. In some embodiments the confidence value for each user characteristic may be returned from user profiling device 210 to the device, system, or entity from which user profiling device 210 received the name.

Storage element may also include a naming engine 217. Naming engine 217 may be a set of software code executable by processor 212 and may include one or more rules for determining name characteristics 272 based on a given name. Naming engine 217 may use a single word in a name or a combination of words in a name. For example, naming engine 217 may detect certain patterns in a name. The naming engine 217 may then indicate one or more name characteristic 272 based on the single word or combination of words in the name. For example, naming engine 217 may determine that any Korean-based name is associated with a religion of Buddhism and/or Christianity. In some embodiments, once such an association is generated, database pointers may be used to associate the name characteristics 272 to name 270.

In one embodiment, naming engine 217 may determine confidence values associated with name characteristics. That is, based on the single word in the name or the combination of words in the name, the naming engine 217 may determine not only one or more characteristic 272 based on the single word or combination of words but also a confidence level for that one or more characteristic 272. For example, naming engine 217 may determine that a particular combination of Korean-based words in a name is associated with a religion of Buddhism at a confidence level of 90%. In some embodiments, database pointers may be used to associate various elements within database 218, such as confidence values with name characteristics 272.

In another embodiment, the confidence values associated with name characteristics may be determined based on a number of sources associating a name characteristic to a name. For example, a first number of experts may associate a name with a particular name characteristic, while a second number of experts do not associate the name with the particular name characteristic. A confidence value that the name should actually be associated with the particular name characteristic may be determined as a ratio of the first number to the second number. In other embodiments, additional or alternative information may be used to determine the confidence values associated with name characteristics. For example, the reliability of the experts, the confidence that the experts have in their opinion, etc. may be used.

In some embodiments, user profiling device 210 may receive additional user information other than the name of a person. The additional user information may also be used to determine, for example, name characteristics, user characteristics, and/or confidence values. For example, user profiling device 210 may receive behavioral information such as information identifying a previous purchase by the person. The information identifying the previous purchase may then be used to increase or decrease a confidence level in, for example, the social status associated with the name of the person.

Storage element may also include inference engine 219. Inference engine 219 may be a set of software code executable by processor 212 and may include one or more rules for inferring characteristics of a person based on one or more name characteristics. For example, inference engine 219 may determine that an upper-class social status indicates a significant economic potential of the person having that name. For another example, inference engine 219 may determine that a Buddhist religion indicates an interest in visiting Buddhist temples. In some embodiments, once such an association is generated, database pointers may be used to associate the user characteristics 274 to name characteristics 272 and/or name 270.

In one embodiment, inference engine 219 may determine confidence values associated with user characteristics. Inference engine 210 may determine the confidence values associated with user characteristics based on the number of name characteristics used to generate the user characteristics. For example, the level of confidence may be increased where a high number of name characteristics are used to generate a user characteristic, and may be decreased where a low number of name characteristics are used to generate a user characteristic. Inference engine 210 may also or alternatively determine the confidence values associated with user characteristics based on one or more confidence values associated with the name characteristics which are used to determine a user characteristic. For example, consider a social status designated as affluent at an 80% level of confidence, and a nativity designated as Greece at a 70% level of confidence. An interest in high-priced vacations in Greece may then be determined by combining the 80% and the 70% levels of confidence. In some embodiments, database pointers may be used to associate various elements within database 218, such as confidence values with user characteristics 274.

Retail system 220 may be any suitable system of electronic computing devices for providing a retail environment, where the retail environment may facilitate the sale of products and/or services. Accordingly, retail system 220 may include one or more electronic computing devices, having any suitable components such as one or more of those discussed with reference to FIG. 5.

End user device 230 may be any suitable electronic computing device associated with an end user for which a product or service is offered for sale. Accordingly, end user device 230 may have any suitable components such as one or more of those discussed with reference to FIG. 5. In some embodiments, system 200 may not include end user device 230, and thus retail system 220 may offer customized products and/or services directly or indirectly to an end user.

In one embodiment, end user device 230 is operable to provide a name of a person to retail system 220. For example, the name of the person may be provided as a text string during a transaction with retail system 220. Retail system 220 may then communicate the name to user profiling device 210. User profiling device 210, in response to receiving the name, may first determine characteristics associated with the name, and then from one or more of those name characteristics infer characteristics associated with the person. User profiling device 210 may then return one or more of the characteristics associated with the person to retail system 220. Retail system 220 may then subsequently use the returned user characteristics to generate an offer for a product or service that is customized to the user associated with end user device 230. For example, if the returned user characteristics indicate a significant economic potential, retail system 220 may generate an offer for an expensive vacation package.

Expert input device 240 may be any suitable electronic computing device associated with an expert of naming conventions. Accordingly, expert input device 240 may have any suitable components such as one or more of those discussed with reference to FIG. 5. In one embodiment, expert input device 240 is operable to receive a name from user profiling device 210. A naming expert associated with expert input device 240 may subsequently communicate characteristics and/or confidence values associated with the name to user profiling device 210 via expert input device 240. In such a fashion, name characteristics and/or confidence values associated with names stored in database 218 may be populated. In another embodiment, a naming expert may communicate characteristics and/or confidence values associated with a name not stored in database 218. For example, the naming expert may communicate a new name and associated characteristics and/or confidence values to user profiling device 210 via expert input device 240 for storage in database 218. In yet another embodiment, a naming expert may communicate one or more rules to user profiling device for storage in storage element 216. For example, a naming expert may communicate via expert input device 240 one or more rules to be used by naming engine 217 and/or inference engine 219.

Third party server 250 may be any suitable computer server that stores various information concerning names, such as names, name characteristics, confidence values associated with name characteristics, user characteristics, and/or confidence values associated with user characteristics. Accordingly, third party server 250 may have any suitable components such as one or more of those discussed with reference to FIG. 5.

In one embodiment, user profiling device 210 is operable to mine information from third party server 250. For example, user profiling device 210 may provide one or more names to third party server 250. In response, third party server 250 may communicate one or more name characteristic, one or more confidence value associated with name characteristics, one or more user characteristic, and/or one or more confidence value associated with user characteristics. For another example, user profiling device 210 need not provide names to third party server 250. Rather, user profiling device 210 may communicate a request for names, name characteristics, user characteristics, and/or confidence values, and such information may be provided to user profiling device 210 from third party server 250 in response to such a request. In some embodiments, user profiling device 210 may be operable to mine rules for naming engine 217 and/or inference engine 219 from third party server 250 similar to mining other information such as names, name characteristics, user characteristics, and/or confidence values.

By continually receiving information from one or more of the aforementioned sources (i.e., retail system 220, end user device 230, expert input device 240, and/or third party server 250), a quality of user profiling device 210 may increase over time. That is, the number of name characteristics and/or user characteristics associated with a given name may increase over time, and/or confidence values associated with the name characteristics and/or user characteristics may increase over time.

Network 260 is any suitable network for enabling communications between various entities, such as between user profiling device 210 and one or more of retail system 220, expert input device 240, and third party server 250. Such a network may include, for example, a local area network, a wide-area network, a virtual private network, the Internet, an intranet, an extranet, a public switched telephone network, an infrared network, a wireless network, a wireless data network, a cellular network, or any other such network or combination thereof. The network may, furthermore, incorporate any suitable network topology. Examples of suitable network topologies include, but are not limited to, simple point-to-point, star topology, self organizing peer-to-peer topologies, and combinations thereof. Components utilized for such a system may depend at least in part upon the type of network and/or environment selected. Network 260 may utilize any suitable protocol, such as TCP/IP, OSI, FTP, UPnP, NFS, CIFS, and AppleTalk. Communication over the network may be enabled by wired or wireless connections, and combinations thereof. A similar network may be used for enabling communication between retail system 220 and end user device 230.

System 200 in certain embodiments is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 2. Thus, the depiction of system 200 in FIG. 2 should be taken as being illustrative in nature, and not limiting to the scope of the disclosure.

Figure 3:
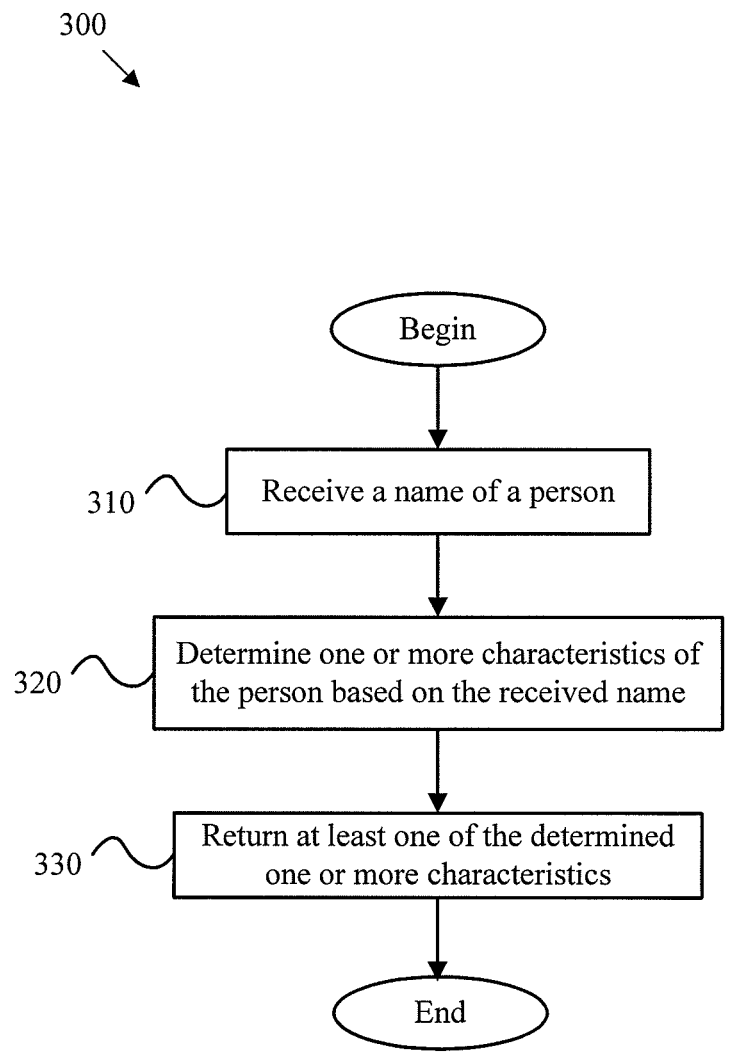
FIG. 3 is a flowchart depicting example operations that may be included in a method for generating a profile of a person in accordance with a first embodiment.

FIG. 3 is a flowchart depicting example operations that may be included in a method for generating a profile of a person in accordance with a first embodiment. In operation 310, a name of a person is received. The name may consist of a single word or multiple words, and may be a text string or other suitable data block. The name of the person may be received, for example, by user profiling device 210 via input/output interface 214 (see FIG. 2). The name may be received from any suitable source. For example, the name may be received from a retail system 220 or end user device 230 (see FIG. 2).

In operation 320, one or more characteristics of the person are determined based on the received name. The characteristics of the person may include, for example, one or more of the person's age, interests, habits, economic potential, and likelihood of buying something at a given point of time. The characteristics may be determined, for example, by user profiling device 210.

In operation 330, at least one of the determined one or more characteristics is returned. For example, user profiling device 210 may communicate all of the determined characteristics or only some of the determined characteristics. User profiling device 210 may communicate the determined user characteristics to any suitable entity, including one or more of retail system 220, end user device 230, expert input device 240, and/or third party server 250.

It should be appreciated that the specific operations illustrated in FIG. 3 provide a particular method for generating a profile of a person, according to certain embodiments of the present invention. Other sequences of operations may also be performed according to alternative embodiments. For example, alternative embodiments of the present invention may perform the operations outlined above in a different order. Moreover, the individual operations illustrated in FIG. 3 may include multiple sub-operations that may be performed in various sequences as appropriate to the individual operation. Furthermore, additional operations may be added or existing operations removed depending on the particular applications. One of ordinary skill in the art would recognize and appreciate many variations, modifications, and alternatives.

Figure 4:
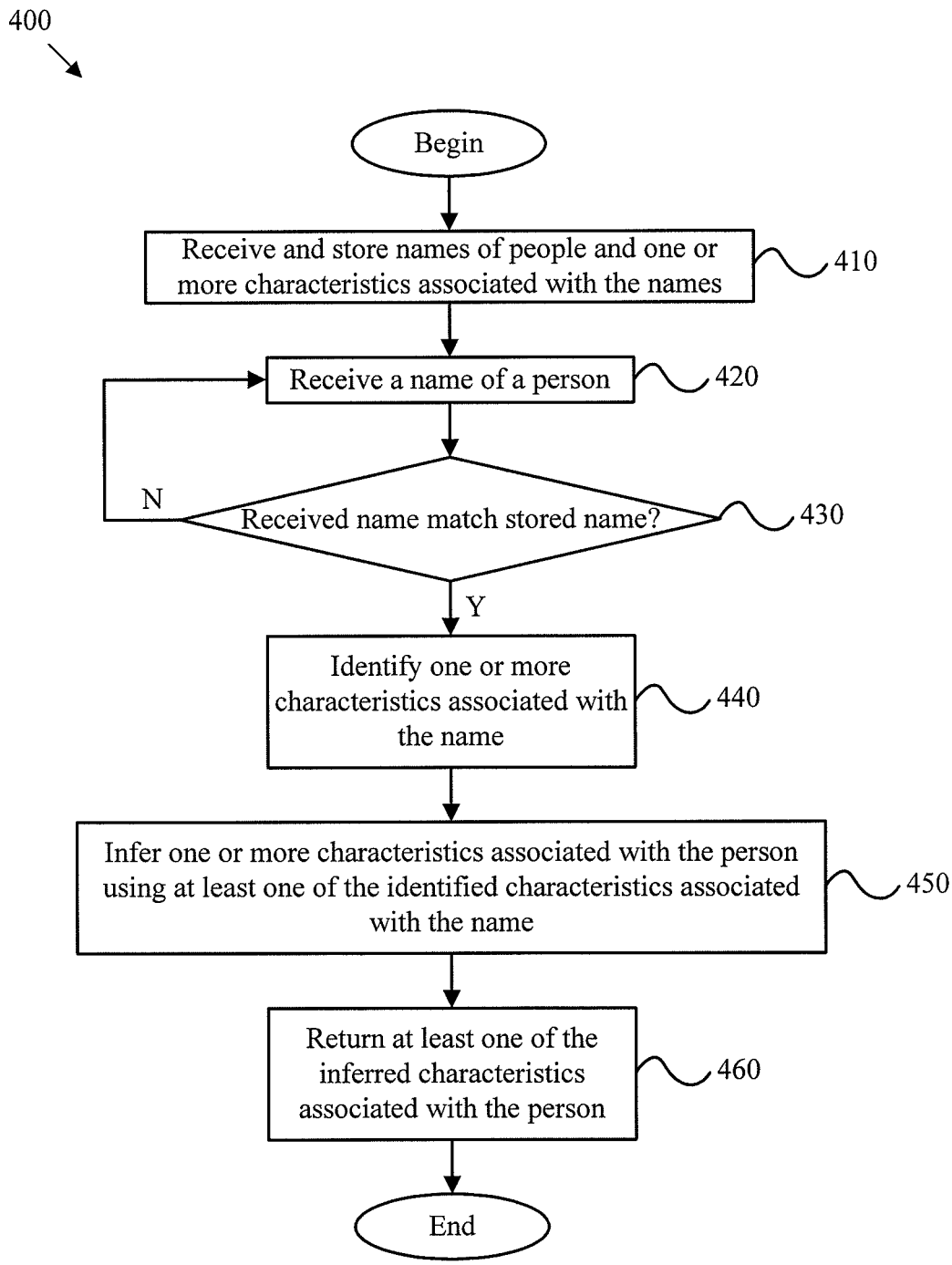
FIG. 4 is a flowchart depicting example operations that may be included in a method for generating a profile of a person in accordance with a second embodiment.

FIG. 4 is a flowchart depicting example operations that may be included in a method for generating a profile of a person in accordance with a second embodiment. In operation 410, names of people and one or more characteristics associated with the names are received and stored. For example, user profiling device 210 (see FIG. 2) may receive the names of people and one or more characteristics from any suitable device, system, or element, such as retail system 220, end user device 230, expert user device 250, and/or third party server 250. User profiling device 210 may then store the received information in, for example, storage element 216. In such a fashion, user profiling device 210 may built a database 218 that stores names 270 and one or more name characteristic 272 associated with each name 270.

In operation 420, a name of a person is received. The name may consist of a single word or multiple words, and may be a text string or other suitable data block. The name of the person may be received, for example, by user profiling device 210 via input/output interface 214. The name may be received from any suitable source. For example, the name may be received from a retail system 220, end user device 230, expert input device 240, and/or third party server 250.

In operation 430, a determination is made as to whether the received name matches a stored name. For example, user profiling device 210 may compare the received name to names stored in database 218 to determine whether the received name is identical to any of the stored names. If the received name is identical to at least one of the stored names, it may be determined that the received name matches a stored name, and processing may continue with operation 440. On the other hand, if the received name is not identical to any of the stored names, it may be determined that the received name does not match a stored name, and processing may return to operation 420. In some embodiments, the names may not need to be identical to determine a match, but rather fuzzy logic may be used where a match is determined if the names are approximately the same.

In operation 440, one or more characteristics associated with the name are identified. For example, upon matching the received name with a name stored in database 218, user profiling device 210 may identify the name characteristics 272 associated with the name. In one embodiment, this may include reading associated name characteristics for which associations have been predetermined. In another embodiment, this may include execution of naming engine 217 so as to determine the associated name characteristics in real-time. In some embodiments, identification of name characteristics 272 may include the identification of confidence values associated with name characteristics 272.

In operation 450, one or more characteristics associated with the person are inferred using at least one of the identified characteristics associated with the name. For example, upon identifying the name characteristics 272, user profiling device 210 may infer one or more user characteristics 274 based on one or more of the identified name characteristics 272. In one embodiment, this may include reading inferred user characteristics for which associations have been predetermined. In another embodiment, this may include execution of inference engine 219 so as to determine the inferred user characteristics in real-time. In some embodiments, the inference of user characteristics 274 may include the determination of confidence values associated with user characteristics 274.

In operation 460, at least one of the inferred characteristics associated with the person is returned. For example, user profiling device 210 may return one or more of the user characteristics 274 inferred in operation 450. In some embodiments, additional information may be returned. For example, one or more name characteristics 272 and/or one or more confidence values may be returned. In one embodiment, the desired information to be returned may be input into user profiling device 210. For example, in operation 420, in addition to receiving a name of a person, user profiling device 210 may also receive a request for specific information to be returned, where the request may identify one or more user characteristics, name characteristics, and/or confidence values to be returned by user profiling device 210.

It should be appreciated that the specific operations illustrated in FIG. 4 provide a particular method for generating a profile of a person, according to certain embodiments of the present invention. Other sequences of operations may also be performed according to alternative embodiments. For example, alternative embodiments of the present invention may perform the operations outlined above in a different order. Moreover, the individual operations illustrated in FIG. 4 may include multiple sub-operations that may be performed in various sequences as appropriate to the individual operation. Furthermore, additional operations may be added or existing operations removed depending on the particular applications. One of ordinary skill in the art would recognize and appreciate many variations, modifications, and alternatives.

Figure 5:
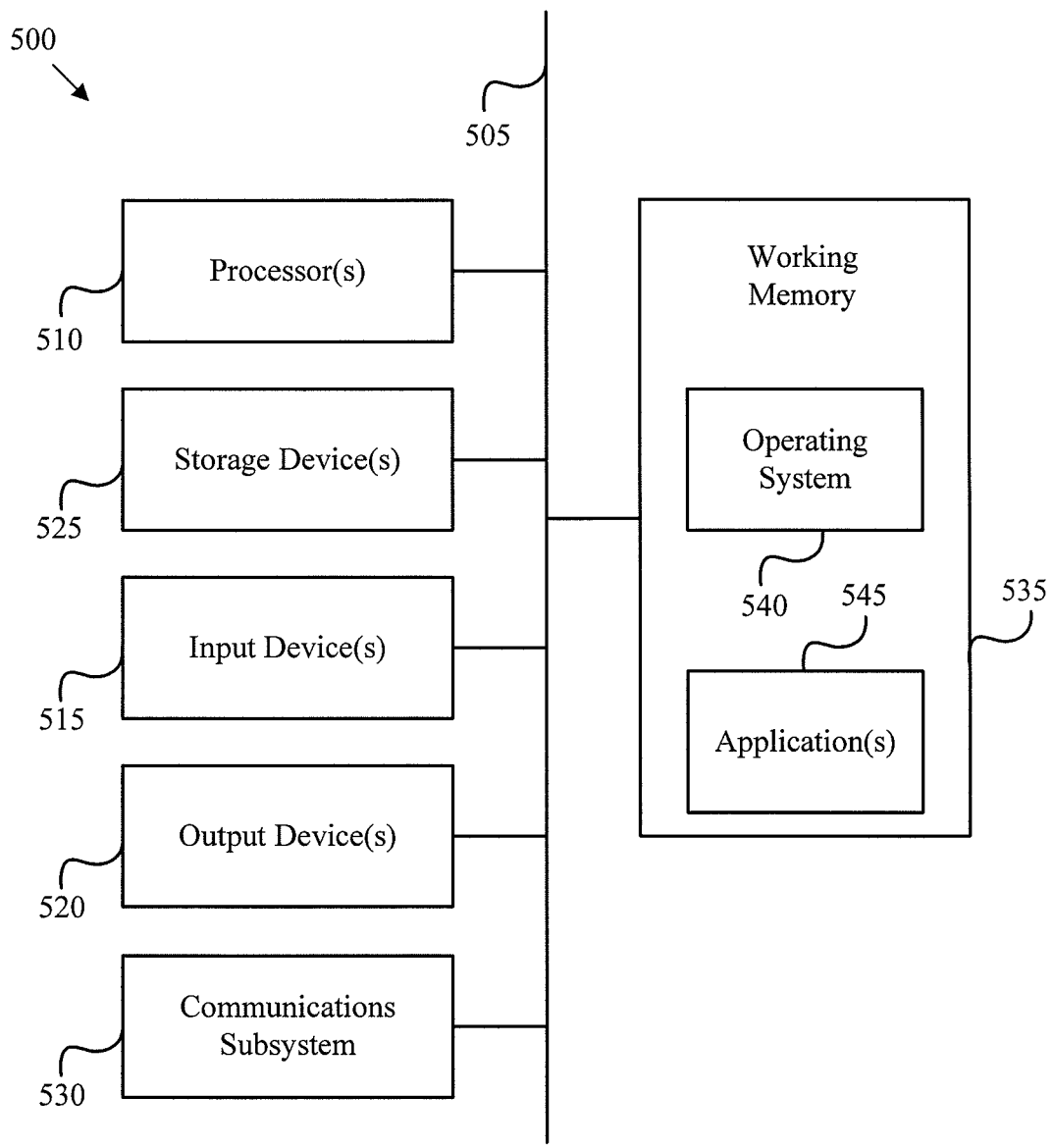
FIG. 5 provides a schematic illustration of one embodiment of a computer system that can perform one or more of the operations discussed with reference to FIGS. 1 to 4.

FIG. 5 provides a schematic illustration of one embodiment of a computer system 500 that can perform one or more of the operations discussed with reference to FIGS. 1 to 4. For example, computer system 500 may include components for performing one or more of the operations discussed with reference to user profiling device 100, user profiling device 210, retail system 220, end user device 230, expert input device 240, and/or third party server 250. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processors 510, including without limitation one or more general-purpose processors and/or one or more special-purpose processors (such as digital signal processing chips, graphics acceleration processors, and/or the like); one or more input devices 515, which can include without limitation a mouse, a keyboard and/or the like; and one or more output devices 520, which can include without limitation a display device, a printer and/or the like.

The computer system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 530 may permit data to be exchanged with a network (such as the network described below, to name one example), other computer systems, and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 525 described above. In some cases, the storage medium might be incorporated within a computer system, such as the system 500. In other embodiments, the storage medium might be separate from a computer system (e.g., a removable medium, such as a compact disc), and or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the storage device(s) 525. Merely by way of example, execution of the sequences of instructions contained in the working memory 535 might cause the processor(s) 510 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processor(s) 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 525. Volatile media include, without limitation, dynamic memory, such as the working memory 535. Transmission media include, without limitation, coaxial cables, copper wire and fiber optics, including the wires that comprise the bus 505, as well as the various components of the communication subsystem 530 (and/or the media by which the communications subsystem 530 provides communication with other devices). Hence, transmission media can also take the form of waves (including without limitation radio, acoustic and/or light waves, such as those generated during radio-wave and infrared data communications).

Common forms of physical and/or tangible non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/ or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 510 retrieves and executes the instructions. The instructions received by the working memory 535 may optionally be stored on a storage device 525 either before or after execution by the processor(s) 510.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various operations may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional operations not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of operations may be undertaken before, during, or after the above elements are considered. Accordingly, the above description should not be taken as limiting the scope of the invention.

What is claimed is:

1. A method for automatically generating a profile of a person, comprising:
    for each of a plurality of names, assuming a name characteristic that people with the name typically have, comprising:
        receiving, for a name of a person and from a plurality of third parties, information indicating a characteristic that people with the name of the person typically have; and
        calculating a confidence value associated with the characteristic as the percentage of the third parties that associated the characteristic with the name;
    storing the name characteristic in association with each of the plurality of names, wherein the name characteristic associated with each of the stored names is each associated with the calculated confidence value;
    receiving, at a computing device, a name of an individual person;
    determining, by a processor of the computing device, whether the received name of the individual person matches any of the plurality of stored names; and
    in response to determining that the received name matches a first of the stored names:
        identifying the name characteristic associated with the first stored name that matches the received name;
        determining a characteristic of the person based on the identified name characteristic; and
        returning the determined characteristic of the person.

2. The method of claim 1, wherein the name characteristics associated with the stored names are selected from the group comprising: nativity, religion, gender, family social status, and time period.

3. The method of claim 1, wherein the characteristic of the person is selected from the group comprising: age, interests, habits, economic potential, and likelihood of buying something at a given point of time.

4. The method of claim 1, further comprising:
    customizing a product or service for the person based on the determined characteristic of the person.

5. The method of claim 4, further comprising:
    communicating the customized product or service to the person.

6. The method of claim 1, wherein the determining a characteristic of the person includes detecting a pattern in the received name.

7. The method of claim 1, wherein the name of the individual person is a family name.

8. A device, comprising:
    a communication interface that receives a name of an individual person;
    a storage element that stores a plurality of names; and
    a processor that:
        receiving, for a name of a person and from a plurality of third parties, information indicating a name characteristic that people with the name of the person typically have;
        calculating a confidence value associated with the name characteristic as the percentage of the third parties that associated the name characteristic with the name;
        stores the name characteristic and the calculated confidence value in the storage element in association with each of the corresponding plurality of names;
        determines whether a received name of the individual person matches any of the stored names; and
        in response to determining that the received name matches a first of the stored names:

identifies the name characteristic associated with the first stored name that matches the received name;

determines one or more user characteristics of the person associated with the received name based on the identified name characteristic; and returns at least one of the determined one or more user characteristics.

9. The device of claim 8, wherein the communication interface receives a request for information to be returned, the request for information identifying a particular user characteristic to be returned, and the processor communicates via the communication interface the particular user characteristic identified by the request for information and determined from the one or more name characteristics.

10. The device of claim 8, wherein the name characteristics are selected from the group comprising: nativity, religion, gender, family social status, and time period.

11. The device of claim 8, wherein the user characteristics are selected from the group comprising: age, interests, habits, economic potential, and likelihood of buying something at a given point of time.

12. The device of claim 8, wherein the user characteristics are associated with confidence values.

13. The device of claim 12, wherein the confidence values associated with the user characteristics are determined from the confidence values of the name characteristics used to determine the user characteristics.

14. The device of claim 12, wherein the confidence values associated with the user characteristics are determined from the number of name characteristics used to determine the user characteristics.

15. A tangible, non-transient computer-readable medium comprising instructions stored thereon for causing a computer to perform operations comprising:

receiving, for a name of a person and from a plurality of third parties, information indicating a name characteristic that people with the name of the person typically have, each of the names is common to many people, the name characteristics for a particular name are characteristics that are expected to be found in people sharing the particular name;

calculating a confidence value associated with the name characteristic as the percentage of the third parties that associated the name characteristic with the name;

store the received names and associated name characteristics with the associated confidence values;

receive a name of an individual person;

determine whether the received name matches any of the stored names;

if the received name matches a first of the stored names, identify one or more name characteristics associated with the received name;

infer one or more user characteristics associated with the individual person using at least one of the identified name characteristics; and return at least one of the inferred user characteristics.

16. The computer-readable medium of claim 15, wherein the instructions are operable to cause the computer to perform further operations comprising:

associate one or more name characteristics with the received name by detecting one or more patterns in the received name.

17. The computer-readable medium of claim 15, wherein the instructions are operable to cause the computer to perform further operations comprising:

receive additional user information; and increase or decrease a confidence value for the identified name characteristics based on the received additional user information.

18. The computer-readable medium of claim 17, wherein the additional user information includes behavioral information of the person.

\* \* \* \* \*